United States Patent
Mordechai et al.

(10) Patent No.: US 11,808,841 B2
(45) Date of Patent: Nov. 7, 2023

(54) FUSION OF DEPTH IMAGER AND RADAR SYSTEM IN A VEHICLE

(71) Applicant: GM Global Technology Operations LLC, Detroit, MI (US)

(72) Inventors: Emanuel Mordechai, Mishmarot (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 17/062,965

(22) Filed: Oct. 5, 2020

(65) Prior Publication Data
US 2022/0107405 A1  Apr. 7, 2022

(51) Int. Cl.
*G01S 13/86* (2006.01)
*G01S 13/89* (2006.01)
*G01S 7/41* (2006.01)
*G01S 13/931* (2020.01)

(52) U.S. Cl.
CPC ............. *G01S 13/865* (2013.01); *G01S 7/411* (2013.01); *G01S 7/415* (2013.01); *G01S 13/89* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 2007/0073473 A1* | 3/2007 | Altan | G01S 13/862 701/518 |
| 2019/0331768 A1* | 10/2019 | Harrison | G06F 18/217 |
| 2020/0184718 A1* | 6/2020 | Chiu | G06T 7/20 |
| 2021/0295113 A1* | 9/2021 | Sless | G01S 7/414 |
| 2022/0221570 A1* | 7/2022 | Zhu | G01S 13/582 |

* cited by examiner

*Primary Examiner* — Marcus E Windrich
(74) *Attorney, Agent, or Firm* — CANTOR COLBURN LLP

(57) ABSTRACT

Systems and methods to perform sensor fusion with a depth imager and a radar system involve transmitting radio frequency (RF) energy from the radar system to a region and simultaneously emitting light to the region using a light source, Reflected light is received at a depth imager aligned with the light source, and RF reflections are received at the radar system. The reflected light is processed to obtain azimuth, elevation, range, variance in range, and reflectivity to each pixel that makes up the region. Processing the RF reflections provides azimuth, elevation, range, variance in range, velocity, and variance in velocity to a subset of the pixels representing a region of interest. Performing the sensor fusion includes using the azimuth, the elevation, the variance in range, and the reflectivity resulting from the depth imager and the range, the velocity, and the variance in velocity resulting from the radar system.

20 Claims, 3 Drawing Sheets

FUSION OF DEPTH IMAGER AND RADAR SYSTEM IN A VEHICLE

The subject disclosure relates to a fusion of a depth imager and a radar system in a vehicle.

Vehicles (e.g., automobiles, trucks, construction equipment, farm equipment, automated factory equipment) increasingly employ sensors to obtain information about the vehicle and its environment. Information from the sensors facilitates semi-autonomous operation (e.g., lane departure correction, automated steering or braking) and autonomous operation of the vehicle. Exemplary sensors that are typically used to obtain information about the environment of the vehicle include cameras, radio detection and ranging (radar) systems, and light detection and ranging (lidar) systems. Generally, a depth imager is not regarded as being suitable for an automotive application, but the sensor may be advantageous when its drawbacks are addressed. Accordingly, it is desirable to provide fusion of a depth imager and a radar system in a vehicle.

SUMMARY

In one exemplary embodiment, a method of performing sensor fusion with a depth imager and a radar system includes transmitting radio frequency (RF) energy from the radar system to a region, and emitting light to the region using a light source simultaneously with transmission of the RF energy. The method also includes receiving, at a depth imager aligned with the light source, reflected light from the region resulting from the light emitted by the light source, and receiving, at the radar system, RF reflections resulting from reflection of the RF energy emitted by the radar system by one or more objects in the region. The reflected light is processed to obtain azimuth, elevation, range, variance in range, and reflectivity to each pixel among a plurality of pixels that make up the region. The RF reflections are processed to obtain azimuth, elevation, range, variance in range, velocity, and variance in velocity to a subset of the plurality of pixels of the region corresponding to the one or more objects, the subset of the plurality of pixels in the region representing a region of interest. The sensor fusion is performed in the region of interest determined by the radar system by using the azimuth, the elevation, the variance in range, and the reflectivity resulting from the depth imager and the range, the velocity, and the variance in velocity resulting from the radar system.

In addition to one or more of the features described herein, the performing the sensor fusion includes obtaining a high-resolution image in the region of interest.

In addition to one or more of the features described herein, the obtaining the high-resolution image in the region of interest includes obtaining the azimuth, the elevation, and the reflectivity resulting from the depth imager for the subset of the plurality of pixels corresponding with the region of interest determined by the radar system.

In addition to one or more of the features described herein, the performing the sensor fusion includes determining a fusion-based range to the one or more objects corresponding with the subset of the plurality of pixels.

In addition to one or more of the features described herein, the determining the fusion-based range includes using the range based on the reflected light, the range based on the RF reflections, and a maximum detectable range of the depth imager.

In addition to one or more of the features described herein, the maximum detectable range is based on a frequency of the light emitted by the light source.

In another exemplary embodiment, a method of performing sensor fusion in a vehicle with a depth imager and a radar system includes transmitting radio frequency (RF) energy from the radar system to a region, and emitting light to the region using a light source simultaneously with transmission of the RF energy. The method also includes receiving, at a depth imager aligned with the light source, reflected light from the region resulting from the light emitted by the light source, and receiving, at the radar system, RF reflections resulting from reflection of the RF energy emitted by the radar system by one or more objects in the region. The reflected light is processed to obtain azimuth, elevation, range, variance in range, and reflectivity to each pixel among a plurality of pixels that make up the region. The RF reflections are processed to obtain azimuth, elevation, range, variance in range, velocity, and variance in velocity to a subset of the plurality of pixels of the region corresponding to the one or more objects, the subset of the plurality of pixels in the region representing a region of interest. The sensor fusion is performed in the region of interest determined by the radar system by using the azimuth, the elevation, the variance in range, and the reflectivity resulting from the depth imager and the range, the velocity, and the variance in velocity resulting from the radar system. Autonomous or semi-autonomous control of the vehicle is implemented based on information obtained by the sensor fusion.

In addition to one or more of the features described herein, the performing the sensor fusion includes obtaining a high-resolution image in the region of interest.

In addition to one or more of the features described herein, the obtaining the high-resolution image in the region of interest includes obtaining the azimuth, the elevation, and the reflectivity resulting from the depth imager for the subset of the plurality of pixels corresponding with the region of interest determined by the radar system.

In addition to one or more of the features described herein, the performing the sensor fusion includes determining a fusion-based range to the one or more objects corresponding with the subset of the plurality of pixels.

In addition to one or more of the features described herein, the determining the fusion-based range includes using the range based on the reflected light, the range based on the RF reflections, and a maximum detectable range of the depth imager.

In addition to one or more of the features described herein, the maximum detectable range is based on a frequency of the light emitted by the light source.

In yet another exemplary embodiment, a system to perform sensor fusion in a vehicle includes a radar system of the vehicle to transmit radio frequency (RF) energy to a region and receive RF reflections resulting from reflection of the RF energy emitted by the radar system by one or more objects in the region, and an optical sensor including a light source to emit light to the region simultaneously with transmission of the RF energy and including a depth imager aligned with the light source to receive reflected light from the region resulting from the light emitted by the light source. A controller processes the reflected light to obtain azimuth, elevation, range, variance in range, and reflectivity to each pixel among a plurality of pixels that make up the region. RF reflections are processed to obtain azimuth, elevation, range, variance in range, velocity, and variance in velocity to a subset of the plurality of pixels of the region corresponding to the one or more objects, the subset of the plurality of pixels in the region representing a region of interest. Sensor fusion is performed in the region of interest determined by the radar system by using the azimuth, the elevation, the variance in range, and the reflectivity resulting from the depth imager and the range, the velocity, and the variance in velocity resulting from the radar system.

In addition to one or more of the features described herein, the controller obtains a high-resolution image in the region of interest as part of the sensor fusion.

In addition to one or more of the features described herein, the controller obtains the high-resolution image in the region of interest includes obtaining the azimuth, the elevation, and the reflectivity resulting from the depth imager for the subset of the plurality of pixels corresponding with the region of interest determined by the radar system.

In addition to one or more of the features described herein, the controller determines a fusion-based range to the one or more objects corresponding with the subset of the plurality of pixels as part of the sensor fusion.

In addition to one or more of the features described herein, the controller determines the fusion-based range by using the range based on the reflected light, the range based on the RF reflections, and a maximum detectable range of the depth imager.

In addition to one or more of the features described herein, the maximum detectable range is based on a frequency of the light emitted by the light source.

In addition to one or more of the features described herein, the controller implements semi-autonomous control of the vehicle based on information obtained through the sensor fusion.

In addition to one or more of the features described herein, the controller implements autonomous control of the vehicle based on information obtained through the sensor fusion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
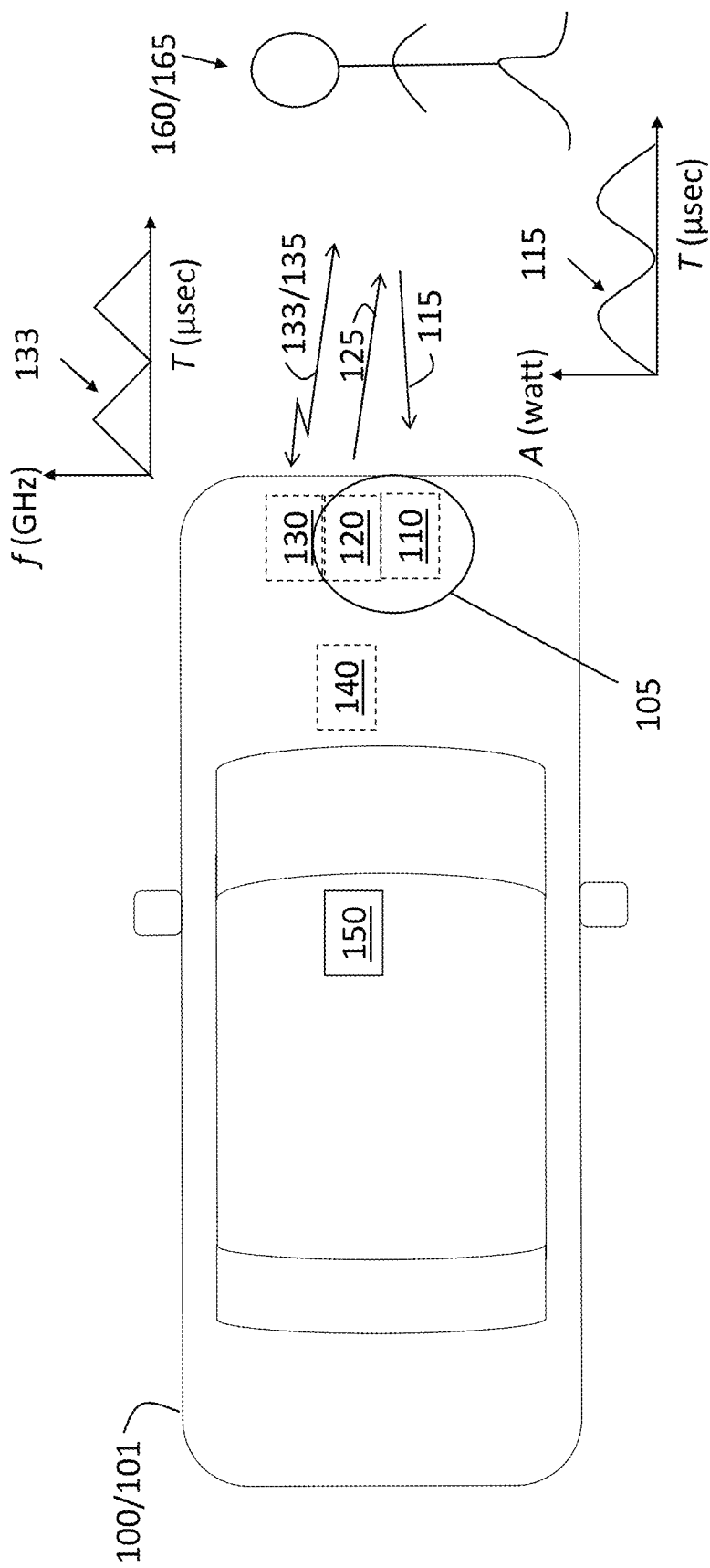
FIG. 1 is a block diagram of a vehicle in which a depth imager is used in conjunction with a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a depth imager is not typically among the sensors used in a vehicle. The depth imager is part of an optical sensor and, more specifically, an optical time-of-flight camera that works synchronously with a light source of the optical sensor to capture the round-trip time of light from the light source to one or more objects to the depth imager, which captures any of the light reflected by the objects. The range and reflectivity obtained by the depth imager provides an image of a scene within a field of view of the optical sensor. The depth imager has an inverse relationship between maximum detectable range and range accuracy. That is, range accuracy increases as frequency increases, but maximum detectable range decreases. This trade-off between maximum detectable range and range accuracy in the depth imager has not been deemed well-suited for use in obtaining information about the environment around the vehicle.

Embodiments of the systems and methods detailed herein relate to fusion of a depth imager and a radar system in a vehicle. Specifically, the depth imager is used in conjunction with a radar system to reap the advantage of each sensor while mitigating the drawback of each sensor. The increased range accuracy at a lower maximum range in the depth imager is combined with longer maximum range of the radar system. The reflectivity information from the depth imager facilitates obtaining a high density reflectivity image that is not possible with the radar system alone. An amplitude modulated continuous wave (AMCW) optical signal is used with the depth imager while a frequency modulated continuous wave (FMCW) radio frequency (RF) signal is used with the radar system, as detailed.

In accordance with an exemplary embodiment, FIG. 1 is a block diagram of a vehicle 100 in which a depth imager 110 is used in conjunction with a radar system 130. The exemplary vehicle 100 in FIG. 1 is an automobile 101. The depth imager 110 is shown co-located with a light source 120. Together, the light source 120 and depth imager 110 may be referred to as an optical sensor 105. The light source 120 may be a laser, vertical cavity surface emitting laser (VCSEL) array, or array of light emitting diodes (LEDs), for example. The light source 120 may emit AMCW light 125, according to exemplary embodiments, such that the depth imager 110 is an AMCW-based indirect-time of flight (i-ToF) depth imager. In the scenario shown in FIG. 1, the light 125 is reflected by an object 160, for example. The exemplary object 160 shown in FIG. 1 is a pedestrian 165. The object 160 may instead be another automobile, a building, shrubbery, or anything else in the environment of the vehicle 100.

The frequency f of the light 125 emitted by the light source 120 may be on the order of a few 10 s of megahertz (MHz). The maximum detectable range Rmax for the depth imager 110 is given by:

$$R_{max} = \frac{c}{2f} \quad [\text{EQ. 1}]$$

Thus, the maximum detectable range Rmax for the depth imager 110 is on the order of 15 meters (m). The range accuracy may be on the order of 0.01 m. The spatial resolution may be 0.1 degrees in azimuth and 0.1 degrees in elevation. By contrast, the maximum detectable range of the radar system 130 may be on the order of 200 m with resolution on the order of 0.1 m. The depth imager 110 and light source 120 need not be co-located as shown in the exemplary case. However, the depth imager 110 must be aligned with the light source 120 such that reflected light 115 is received (i.e., the depth imager 110 and light source 120 must have a common field of view).

The radar system 130 is also shown co-located with the optical sensor 105. The radar system 130 emits RF energy 133 and receives RF reflections 135 based on reflection of some of the RF energy 133 by one or more objects 160 in its field of view. According to one or more embodiments, the optical sensor 105 and the radar system 130 are synchronized and have the same field of view but need not be co-located as shown. As previously noted, the radar system 130 may transmit a frequency modulated continuous wave as the RF energy 133 while the light source 120 emits an amplitude modulated continuous wave as the light 125. Examples of the emitted AMCW light 125 and FMCW RF energy 133 are illustrated in FIG. 1 over time T in microseconds (μsec). The frequency f of the RF energy 133 is indicated in gigahertz (GHz) while the amplitude A of the light 125 is indicated in watts (W).

The vehicle 100 is shown with a controller 140 and one or more other sensors 150 (e.g., camera, lidar system, additional radar). The numbers and locations of the sensors 150 are not limited by the example shown in FIG. 1. The controller 140 may obtain data from the optical sensor 105 and the radar system 130 to perform fusion according to one or more embodiments, as detailed. The depth imager 110 and radar system 130 may perform processing of received signals (115, 135) or may provide data to the controller 140 for processing. The controller 140 may use the information resulting from the fusion, alone or in addition to information from other sensors 150, to control aspects of autonomous or semi-autonomous operation of the vehicle 100. The controller 140 and any processor within the depth imager 110 and/or radar system 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
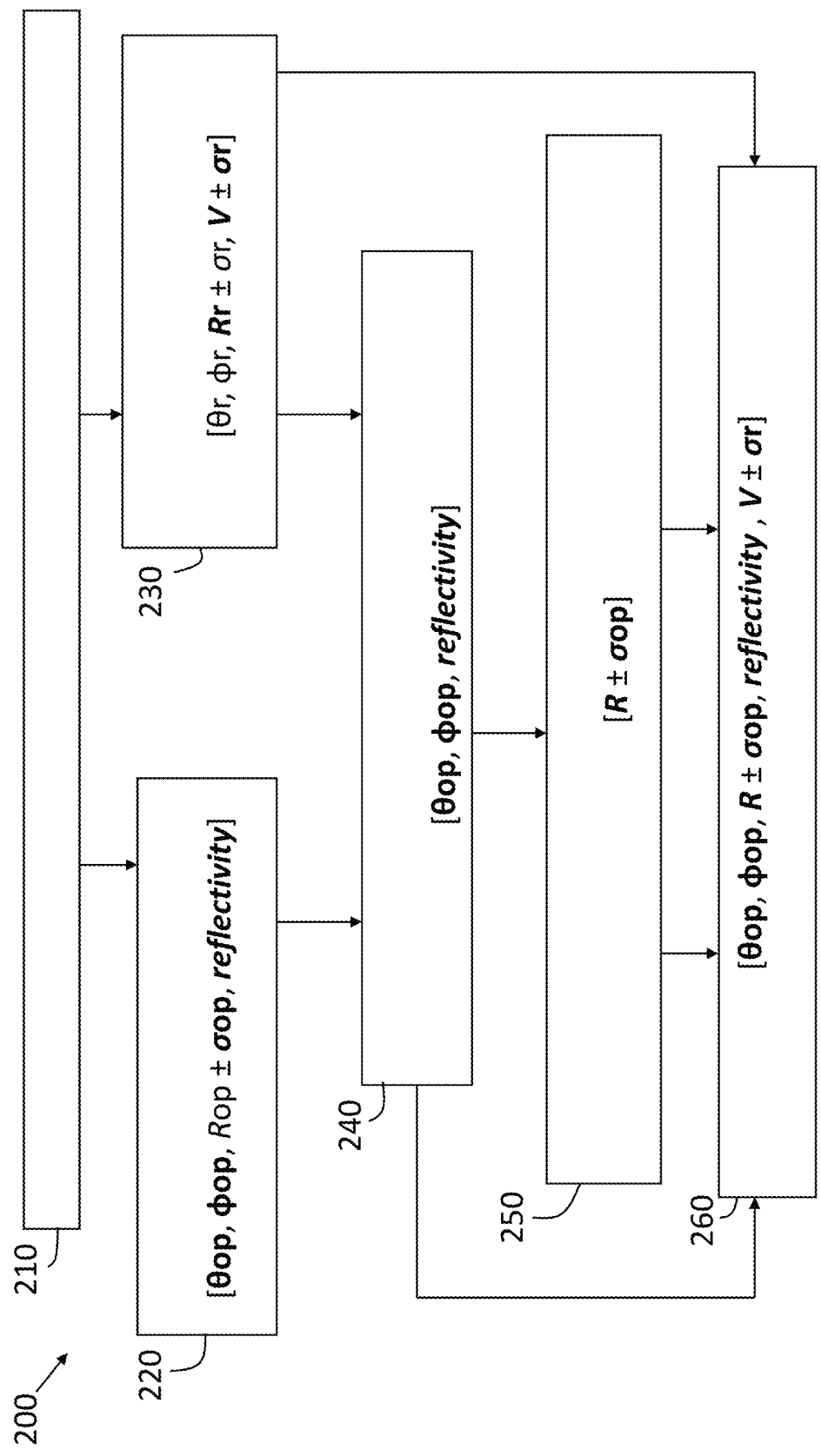
FIG. 2 is a process flow of a method of performing fusion of a depth imager and a radar system in a vehicle according to one or more embodiments.

FIG. 2 is a process flow of a method 200 of performing fusion of a depth imager 110 and a radar system 130 in a vehicle 100 according to one or more embodiments. At block 210, the light source 120 emits light 125 and, simultaneously, the radar system 130 emits RF energy 133. The light 125 may be an AMCW while the RF energy 133 is an FMCW, as shown in FIG. 1. At block 220, the depth imager 110 receives reflected light 115 and processes the reflected light 115 to obtain azimuth θop, elevation ϕop, range Rop with uncertainty (i.e., variance) ±σop, and reflectivity (i.e., amplitude or intensity) for points (i.e., pixels) that make up the overlapping field of view of the light source 120 that emitted the light 125 and the depth imager 110 that received the reflected light 115. That is, the depth imager 110, like any camera, obtains information for every pixel within a field of view (i.e., region) of the camera.

As previously noted, this processing may be performed by processing circuitry within the depth imager 110 or by the controller 140 or by a combination of the two. The "op" designation is used to distinguish the optical sensor 105 from the radar system 130, whose values are designated with "r." In addition, higher accuracy results (e.g., azimuth θop and elevation ϕop obtained via the optical sensor 105 rather than azimuth θr and elevation ϕr obtained via the radar system 130) are indicated in bold in FIG. 2. At this stage, no fusion according to one or more embodiments is involved, and the processing of reflected light 115 received at the depth imager 110 alone is known. Range and reflectivity determination are further discussed with reference to FIG. 3.

At block 230, the radar system 130 receives RF reflections 135 and processes the RF reflections 135 to obtain azimuth θr, elevation ϕr, range Rr with uncertainty σr, and velocity V with variance ±σr for a set of points corresponding to reflectors on one or more objects 160 encountered by the emitted RF energy 133. Unlike the depth imager 110 that obtains information for every pixel in the region that makes up the field of view, the radar system 130 only obtains information for a subset of pixels within the field of view that correspond with objects 160 that reflect RF energy 113 as RF reflections 135. This subset of pixels makes up a region of interest within the full region (i.e., the region of interest is the region occupied by the object 160).

The processing of RF reflections 135 may be performed by processing circuitry within the radar system 130 or by the controller 140 or by a combination of the two. As noted for the depth imager 110, there is no fusion according to one or more embodiments at this stage, and the processing of the RF reflections 135 is well-known. Specifically, a fast Fourier transform is performed along range bins for the set of received RF reflections 135 and then a second FFT is performed on the first FFT result. This is followed by digital beamforming which provides a range-Doppler (i.e., relative velocity) map per beam. A thresholding process is used to obtain azimuth θr and elevation ϕr to each detected object 160, which represents the region of interest, in addition to range Rr with uncertainty σr, and velocity V with variance ±σr.

At block 240, obtaining a high-resolution image in the region of interest represents a first stage in the fusion according to one or more embodiments. Specifically, for the azimuth θr and elevation ϕr pairs obtained in the region of interest identified according to the radar system 130, the corresponding higher-accuracy azimuth θop and elevation ϕop obtained via the depth imager 110 for every pixel within the region of interest and the associated reflectivity at the azimuth θop and elevation ϕop are obtained as the high-resolution image, as indicated in FIG. 2.

At block 250, calculating higher-accuracy range R (i.e., a fusion-based range) for each pixel in the region of interest represents a second stage in the fusion according to one or more embodiments. The relatively higher accuracy range Rr obtained via the radar system 130 and the relatively higher accuracy variance σop obtained via the depth imager 110 are used to obtain range R to each pixel i, j in the region of interest:

$$R_{i,j} = \underset{k \in [-1, 0, 1]}{\operatorname{argmin}} \left\{ \left[ (N_{i,j} + k) \cdot R_{max} + R_{op_{i,j}} - R_r \right] \right\} \quad \text{[EQ. 2]}$$

In EQ. 2, Rmax is the maximum detectable range using the depth imager 110 according to EQ. 1.

$$N_{i,j} = \operatorname{floor}\left(\frac{R_r}{R_{max}}\right) \quad \text{[EQ. 3]}$$

$$R_{op_{i,j}} = R_{i,j} \bmod R_{max} \quad \text{[EQ. 4]}$$

In EQ. 4, each range Ri,j mod (i.e., modulo) Rmax would give the remainder resulting from dividing the range Ri,j by Rmax. In EQS. 2 and 3, Rr could be written $Rr_{i,j}$, but the pixel density of range determined via the radar system 130 is much lower than that obtained via the depth imager 110. Further, the radar system 130 does not have a fixed grid of pixels like the depth imager 110. From the processes at block 250, the higher-accuracy range R computed via fusion using EQ. 2 and the corresponding higher-accuracy range variance σop obtained via the depth imager 110 result.

At block 260, the results from the first fusion steps at blocks 240 and 250 are combined with the velocity V and corresponding variance ±σr from the radar system 130. Specifically, from block 240, the high-resolution image obtained (at block 240) using the depth imager 110 in the region of interest identified by the radar system 130 is represented by reflectivity at the azimuth θop and elevation ϕop associated with the region of interest. From block 250, higher-accuracy range R computed via fusion using EQ. 2 and the corresponding higher-accuracy range variance σop obtained via the depth imager 110 result. The controller 140 may control aspects of autonomous or semi-autonomous operation of the vehicle 100 based on the results. For example, the controller 140 may implement automatic braking, adaptive cruise control, or lane keeping in a semi-autonomous vehicle 100 or may implement trajectory planning in an autonomous vehicle 100 using the higher accuracy information resulting from the fusion as compared with either sensor (105, 130) alone.

Figure 3:
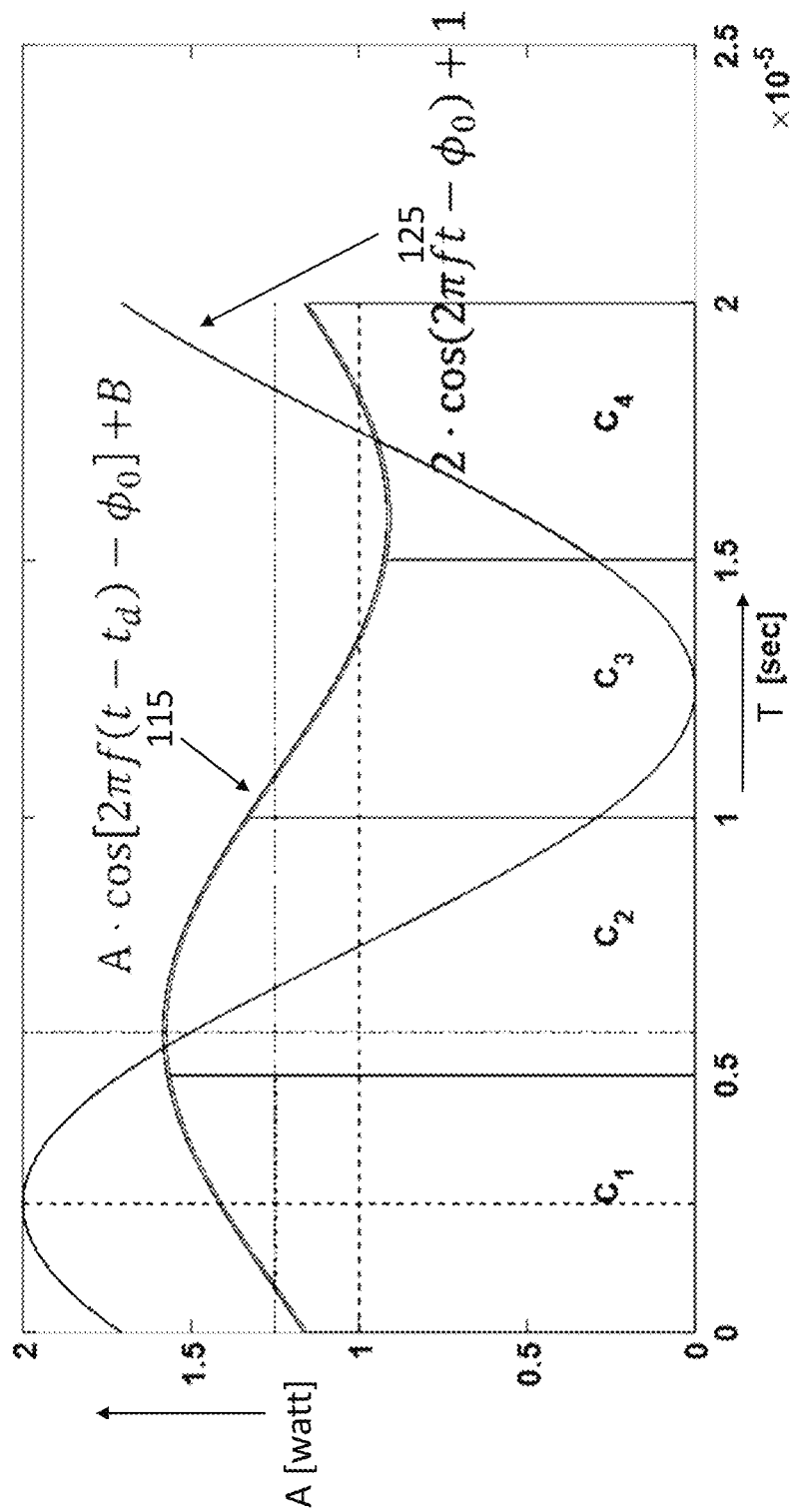
FIG. 3 shows exemplary emitted light and reflected light used by the optical sensor according to one or more embodiments.

FIG. 3 shows exemplary emitted light 125 and reflected light 115 used by the optical sensor 105 according to one or more embodiments. The amplitude A in watts of both signals is shown over time T in seconds (sec). The emitted light 125 is an AMCW signal as shown. Four samples C1, C2, C3, C4 over a period of the reflected light 115 are indicated in the figure. C1, C2, C3, and C4 are integration values resulting from integrating the respective samples of the reflected signal 115. The C1, C2, C3, and C4 values are at the pixel level such that four samples are obtained of each pixel. EQS. 5-7 are used to calculate reflectivity and range per pixel. The range $R_{op}$ to each pixel i, j according to the reflected light 115 is given by:

$$R_{op} = \left(\frac{\phi_d}{2\pi}\right) \cdot R_{max} \quad [\text{EQ. 5}]$$

$$\phi_d = \operatorname{atan}\left(\frac{C_1 - C_3}{C_2 - C_4}\right) \quad [\text{EQ. 6}]$$

The amplitude A is given by:

$$A = \sqrt{\frac{(C_1 - C_3)^2 + (C_2 - C_4)^2}{4}} \quad [\text{EQ. 7}]$$

In EQ. 5, $R_{op}$ is the range and $\phi_d$ is modulation phase delay caused by time-of-flight to an object 160 (i.e., given pixel within the region of interest) and back.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing sensor fusion with a depth imager and a radar system, the method comprising:
   transmitting radio frequency (RF) energy from the radar system to a region;
   emitting light to the region using a light source simultaneously with transmission of the RF energy;
   receiving, at an optical camera including a depth imager aligned with the light source, reflected light from the region resulting from the light emitted by the light source;
   receiving, at the radar system, RF reflections resulting from reflection of the RF energy emitted by the radar system by one or more objects in the region;
   processing the reflected light to obtain azimuth, elevation, range, variance in range, and reflectivity to each pixel among a plurality of pixels that make up the region;
   processing the RF reflections to obtain azimuth, elevation, range, variance in range, velocity, and variance in velocity to a subset of the plurality of pixels of the region corresponding to the one or more objects, the subset of the plurality of pixels in the region representing a region of interest; and
   obtaining a high resolution image of the region of interest based on performing the sensor fusion in the region of interest determined by the radar system by using the azimuth, the elevation, the variance in range, and the reflectivity resulting from the depth imager and the range, the velocity, and the variance in velocity resulting from the radar system, wherein performing the sensor fusion includes assigning the azimuth and the elevation resulting from the depth imager to each pixel in the region of interest.

2. The method according to claim 1, wherein the performing the sensor fusion includes assigning a higher accuracy range to each pixel in the region of interest, the higher accuracy range derived from the range obtained by processing the RF reflections and the variance obtained by processing the reflected light.

3. The method according to claim 1, wherein the obtaining the high-resolution image in the region of interest includes obtaining the azimuth, the elevation, and the reflectivity resulting from the depth imager for the subset of the plurality of pixels corresponding with the region of interest determined by the radar system.

4. The method according to claim 1, wherein the performing the sensor fusion includes determining a fusion-based range to the one or more objects corresponding with the subset of the plurality of pixels.

5. The method according to claim 4, wherein the determining the fusion-based range includes using the range based on the reflected light, the range based on the RF reflections, and a maximum detectable range of the depth imager.

6. The method according to claim 5, wherein the maximum detectable range is based on a frequency of the light emitted by the light source.

7. A method of performing sensor fusion in a vehicle with a depth imager and a radar system, the method comprising:
   transmitting radio frequency (RF) energy from the radar system to a region;
   emitting light to the region using a light source simultaneously with transmission of the RF energy;
   receiving, at an optical camera including a depth imager aligned with the light source, reflected light from the region resulting from the light emitted by the light source;

receiving, at the radar system, RF reflections resulting from reflection of the RF energy emitted by the radar system by one or more objects in the region;

processing the reflected light to obtain azimuth, elevation, range, variance in range, and reflectivity to each pixel among a plurality of pixels that make up the region;

processing the RF reflections to obtain azimuth, elevation, range, variance in range, velocity, and variance in velocity to a subset of the plurality of pixels of the region corresponding to the one or more objects, the subset of the plurality of pixels in the region representing a region of interest;

obtaining a high resolution image of the region of interest based on performing the sensor fusion in the region of interest determined by the radar system by using the azimuth, the elevation, the variance in range, and the reflectivity resulting from the depth imager and the range, the velocity, and the variance in velocity resulting from the radar system, wherein performing the sensor fusion includes assigning the azimuth and the elevation resulting from the depth imager to each pixel in the region of interest; and implementing autonomous or semi-autonomous control of the vehicle based on information obtained by the sensor fusion.

8. The method according to claim 7, wherein the performing the sensor fusion includes assigning a higher accuracy range to each pixel in the region of interest, the higher accuracy range derived from the range obtained by processing the RF reflections and the variance obtained by processing the reflected light.

9. The method according to claim 7, wherein the obtaining the high-resolution image in the region of interest includes obtaining the azimuth, the elevation, and the reflectivity resulting from the depth imager for the subset of the plurality of pixels corresponding with the region of interest determined by the radar system.

10. The method according to claim 7, wherein the performing the sensor fusion includes determining a fusion-based range to the one or more objects corresponding with the subset of the plurality of pixels.

11. The method according to claim 10, wherein the determining the fusion-based range includes using the range based on the reflected light, the range based on the RF reflections, and a maximum detectable range of the depth imager.

12. The method according to claim 11, wherein the maximum detectable range is based on a frequency of the light emitted by the light source.

13. A system to perform sensor fusion in a vehicle, the system comprising:

a radar system of the vehicle, the radar system configured to transmit radio frequency (RF) energy to a region and receive RF reflections resulting from reflection of the RF energy emitted by the radar system by one or more objects in the region;

a light source configured to emit light to the region simultaneously with transmission of the RF energy, and an optical camera including a depth imager aligned with the light source configured to receive reflected light from the region resulting from the light emitted by the light source; and a controller configured to process the reflected light to obtain azimuth, elevation, range, variance in range, and reflectivity to each pixel among a plurality of pixels that make up the region, to process the RF reflections to obtain azimuth, elevation, range, variance in range, velocity, and variance in velocity to a subset of the plurality of pixels of the region corresponding to the one or more objects, the subset of the plurality of pixels in the region representing a region of interest, and to obtain a high resolution image of the region of interest based on performing the sensor fusion in the region of interest determined by the radar system by using the azimuth, the elevation, the variance in range, and the reflectivity resulting from the depth imager and the range, the velocity, and the variance in velocity resulting from the radar system, wherein performing the sensor fusion includes assigning the azimuth and the elevation resulting from the depth imager to each pixel in the region of interest.

14. The system according to claim 13, wherein the controller is configured to assign a higher accuracy range to each pixel in the region of interest, the higher accuracy range derived from the range obtained by processing the RF reflections and the variance obtained by processing the reflected light.

15. The system according to claim 13, wherein the controller is configured to obtain the high-resolution image in the region of interest includes obtaining the azimuth, the elevation, and the reflectivity resulting from the depth imager for the subset of the plurality of pixels corresponding with the region of interest determined by the radar system.

16. The system according to claim 13, wherein the controller is configured to determine a fusion-based range to the one or more objects corresponding with the subset of the plurality of pixels as part of the sensor fusion.

17. The system according to claim 16, wherein the controller is configured to determine the fusion-based range by using the range based on the reflected light, the range based on the RF reflections, and a maximum detectable range of the depth imager.

18. The system according to claim 17, wherein the maximum detectable range is based on a frequency of the light emitted by the light source.

19. The system according to claim 13, wherein the controller is configured to implement semi-autonomous control of the vehicle based on information obtained through the sensor fusion.

20. The system according to claim 13, wherein the controller is configured to implement autonomous control of the vehicle based on information obtained through the sensor fusion.

* * * * *